United States Patent
Shamoulian et al.

(10) Patent No.: US 6,572,814 B2
(45) Date of Patent: Jun. 3, 2003

(54) METHOD OF FABRICATING A SEMICONDUCTOR WAFER SUPPORT CHUCK APPARATUS HAVING SMALL DIAMETER GAS DISTRIBUTION PORTS FOR DISTRIBUTING A HEAT TRANSFER GAS

(75) Inventors: Shamouil Shamoulian, San Jose, CA (US); Arnold Kholodenko, San Francisco, CA (US); Senh Thach, Union City, CA (US); Wing Cheng, Sunnyvale, CA (US)

(73) Assignee: Applied Materials Inc., Santa Clara, CA (US)

( * ) Notice: Subject to any disclaimer, the term of this patent is extended or adjusted under 35 U.S.C. 154(b) by 0 days.

(21) Appl. No.: 09/866,353

(22) Filed: May 24, 2001

(65) Prior Publication Data

US 2001/0024349 A1 Sep. 27, 2001

Related U.S. Application Data

(63) Continuation-in-part of application No. 09/149,807, filed on Sep. 8, 1998, now abandoned.

(51) Int. Cl.[7] .................................................. B22F 7/04
(52) U.S. Cl. ........................... 419/5; 419/36; 264/605; 264/629; 264/657; 264/666
(58) Field of Search ....................... 419/5, 36; 264/605, 264/629, 657, 666

(56) References Cited

U.S. PATENT DOCUMENTS

| | | | | |
|---|---|---|---|---|
| 4,184,188 A | * | 1/1980 | Briglia | 361/234 |
| 4,384,918 A | * | 5/1983 | Abe | 156/643 |
| 4,565,601 A | * | 1/1986 | Kakehi et al. | 216/59 |
| 4,603,466 A | | 8/1986 | Morley | 29/569 R |
| 4,879,261 A | * | 11/1989 | Burn | 501/32 |
| 4,963,713 A | | 10/1990 | Horiuchi et al. | 219/121.43 |
| 5,238,499 A | | 8/1993 | van de Ven et al. | 118/724 |
| 5,382,311 A | | 1/1995 | Ishikawa et al. | 156/345 |
| 5,474,614 A | * | 12/1995 | Robbins | 118/728 |
| 5,522,131 A | * | 6/1996 | Steger | 29/829 |
| 5,589,002 A | | 12/1996 | Su | 118/723 E |
| 5,715,132 A | | 2/1998 | Steger et al. | 361/234 |
| 5,745,331 A | * | 4/1998 | Shamouilian et al. | 361/234 |
| 5,745,332 A | | 4/1998 | Burkart et al. | 361/234 |
| 5,748,435 A | | 5/1998 | Parkhe | 361/234 |
| 5,764,471 A | | 6/1998 | Burkhart | 361/234 |
| 5,766,365 A | * | 6/1998 | Umotoy et al. | 118/728 |
| 5,998,320 A | * | 12/1999 | Yamada et al. | 501/98.4 |
| 6,108,189 A | * | 8/2000 | Weldon et al. | 361/234 |
| 6,267,839 B1 | * | 7/2001 | Shamouilian et al. | 156/345 |
| 6,310,755 B1 | * | 10/2001 | Kholodenko et al. | 361/234 |

* cited by examiner

*Primary Examiner*—Daniel J. Jenkins
(74) *Attorney, Agent, or Firm*—Moser Patterson & Sheridan; Joseph Bach

(57) ABSTRACT

A method of fabricating a semiconductor wafer support chuck apparatus having a first sintered layer and a second sintered layer. The method comprising the steps of providing the first sintered layer having a plurality of gas distribution ports and providing the second sintered layer having a plurality of grooves. The first sintered layer is stacked on top of the second sintered layer, where a diffusion bonding layer is disposed between the first sintered layer and the second sintered layer. Thereafter, the stacked first and second sintered layers are resintered such that the diffusion bonding layer joins the first and second sintered layers together to form a semiconductor wafer support apparatus.

15 Claims, 6 Drawing Sheets

METHOD OF FABRICATING A SEMICONDUCTOR WAFER SUPPORT CHUCK APPARATUS HAVING SMALL DIAMETER GAS DISTRIBUTION PORTS FOR DISTRIBUTING A HEAT TRANSFER GAS

CROSS REFERENCE

This application is a continuation-in-part of U.S. patent application Ser. No. 09/149,807 filed Sep. 8, 1998, NOW ABANDONED, which is hereby incorporated by reference in its entirety.

BACKGROUND OF THE DISCLOSURE

1. Field of the Invention

The invention relates to semiconductor processing equipment and, more particularly, the invention relates to ceramic substrate supports.

2. Description of the Background Art

Susceptors are widely used to retain substrates, such as semiconductor wafers, in semiconductor wafer processing systems during processing. The susceptor is typically mounted to a pedestal. The pedestal is typically fabricated from a metal such as aluminum. For high temperature applications, the susceptor is typically fabricated from a ceramic material such as aluminum oxide or aluminum nitride. The susceptor typically contains various components which provide heating and/or cooling of the wafer as well as clamping (chucking) of the wafer to retain the wafer in a stationary position upon the pedestal surface. The pedestal may also include one or more electrodes for applying a bias voltage to the wafer. Such a bias voltage may be a direct current (DC) bias or a radio frequency (RF) bias.

Electrostatic susceptors (or chucks) retain a substrate by creating an electrostatic attractive force between the workpiece and the chuck. A voltage applied to one or more electrodes in the chuck so induces opposite polarity charges in the workpiece and electrodes. The opposite charges pull the workpiece against the chuck, thereby retaining the workpiece. These chucks find use in different types of wafer processing including etching, chemical vapor deposition (CVD), and physical vapor deposition (PVD) applications. Examples of monopolar and bipolar electrostatic chucks can be found in U.S. Pat. Nos. 5,745,332 and 5,764,471 respectively and are herein incorporated by reference.

The materials and processes used to process a semiconductor wafer are temperature sensitive. Should these materials be exposed to excessive temperature fluctuations due to poor heat transfer from the wafer during processing, performance of the wafer processing system may be compromised. To optimally transfer heat between the wafer and the chuck (or vice versa), an electrostatic force created by the applied voltage causes a large amount of wafer surface to physically contact a support surface of the chuck. However, due to surface roughness of both the wafer and the chuck, small interstitial spaces remain between the chuck and wafer that interfere with optimal heat transfer.

To promote uniform heat transfer characteristics, an inert heat transfer gas (e.g., Helium, Argon, hydrogen, and the like) is introduced beneath the wafer to fill the interstitial spaces between the wafer and the chuck surface. This gas acts as a thermal conduction medium between the wafer and the chuck, and is commonly known as a wafer "backside gas". Moreover, the heat transfer gas has better heat transfer characteristics than the vacuum that exists in the chamber during wafer processing, thereby promoting uniform heat conduction across the entire bottom (i.e., backside) surface of the wafer. Such a heat transfer gas is typically provided by ports provided through the body of the chuck from the wafer support surface to the bottom of the chuck. However, when the chuck is subject to a plasma (i.e., during a particular wafer processing step or chamber cleaning step), the heat transfer gas is prone to ignition thereby generating a plasma in the ports. The plasma in the ports sputters ceramic particles off of the walls of the ports. The sputtered particles enter and contaminate the processing chamber and/or the wafer.

Techniques, such as the use of porous plugs and narrow diameter ports, have been employed to prevent plasma ignition. Specifically, the porous plugs and narrow, high aspect ratio ports are designed to cause electrons that are present during processing to become neutralized (or quenched) upon colliding with the walls or the plugs or ports before encountering a gaseous (He) atom, thereby preventing plasma formation within the ports. Although these techniques do inhibit plasma ignition in the ports, they do have drawbacks. For example, the use of porous ceramic plugs complicates the fabrication of the chuck. Furthermore, porous ceramics tend to be chalky and produce particles that also contaminate wafers during processing. Additionally, for the range of heat transfer gas pressure and electric fields normally encountered in the heat transfer gas ports, the diameter of the hole should be as small as possible. However, it is extremely difficult, time consuming, and expensive to manufacture a ceramic chuck with small diameter holes bored entirely through the chuck body. Holes greater than 3 millimeters (mm) in diameter can be drilled in ceramics relatively easily using diamond drills. Holes 0.5 mm in diameter can be drilled through 3–15 mm of ceramic, at great expense, only by ultrasonic drilling methods. Unfortunately, the optimal hole diameter to eliminate plasma ignition is typically about 0.2 mm. Such holes can only be drilled through a thick plate by expensive laser drilling. Since the heat transfer gas flow rate depends on the overall area of the holes, many small diameter holes (hundreds) are required to feed the heat transfer gas fast enough to achieve the desired heat exchange.

Another technique includes forming a plenum (i.e., one or more radial gas channels and a circumferential groove) in an uncured, ceramic green-body tape layer below the support surface. Additional layers are similarly formed thereabove with desired features such as heat transfer gas distribution ports, lift pin holes and/or provided with other susceptor components such as electrodes. All the layers are then sintered to form a unitary ceramic susceptor having all of the desired features. Unfortunately, the tremendous pressure exerted on the layers during the sintering process (on the order of 100–1000 psi) tends to deform or even collapse some of the features such as the plenum. As such, the features are not highly repeatable during the manufacturing of the susceptor. That is, the features do not have the same dimensions or quality when comparing one susceptor to another. Filler pastes are added to the features of the uncured ceramic, but such pastes do not completely eliminate deformation or avoid collapsing. Additionally, once the filler pastes are added, an extra heating step is required to carbonize the filler thereby removing it from the features.

Therefore, a need exists in the art for an easily fabricated ceramic electrostatic chuck having a heat transfer gas distribution structure that inhibits plasma ignition in the gas delivery channels and a concomitant method of fabricating the same.

SUMMARY OF THE INVENTION

The disadvantages associated with the prior art are overcome by the present invention of a method of fabricating a semiconductor wafer support chuck apparatus having a first sintered layer and a second sintered layer. The method comprising the steps of providing the first sintered layer having a plurality of gas distribution ports and providing the second sintered layer having a plurality of grooves. The first sintered layer is stacked on top of the second sintered layer, where a diffusion bonding layer is disposed between the first sintered layer and the second sintered layer. Thereafter, the stacked first and second sintered layers are resintered such that the diffusion bonding layer joins the first and second sintered layers together to form a semiconductor wafer support apparatus.

BRIEF DESCRIPTION OF THE DRAWINGS

The teachings of the present invention can be readily understood by considering the following detailed description in conjunction with the accompanying drawings, in which.

To facilitate understanding, identical reference numerals have been used where possible to designate identical elements, which are common to the figures.

DETAILED DESCRIPTION

Figure 1:
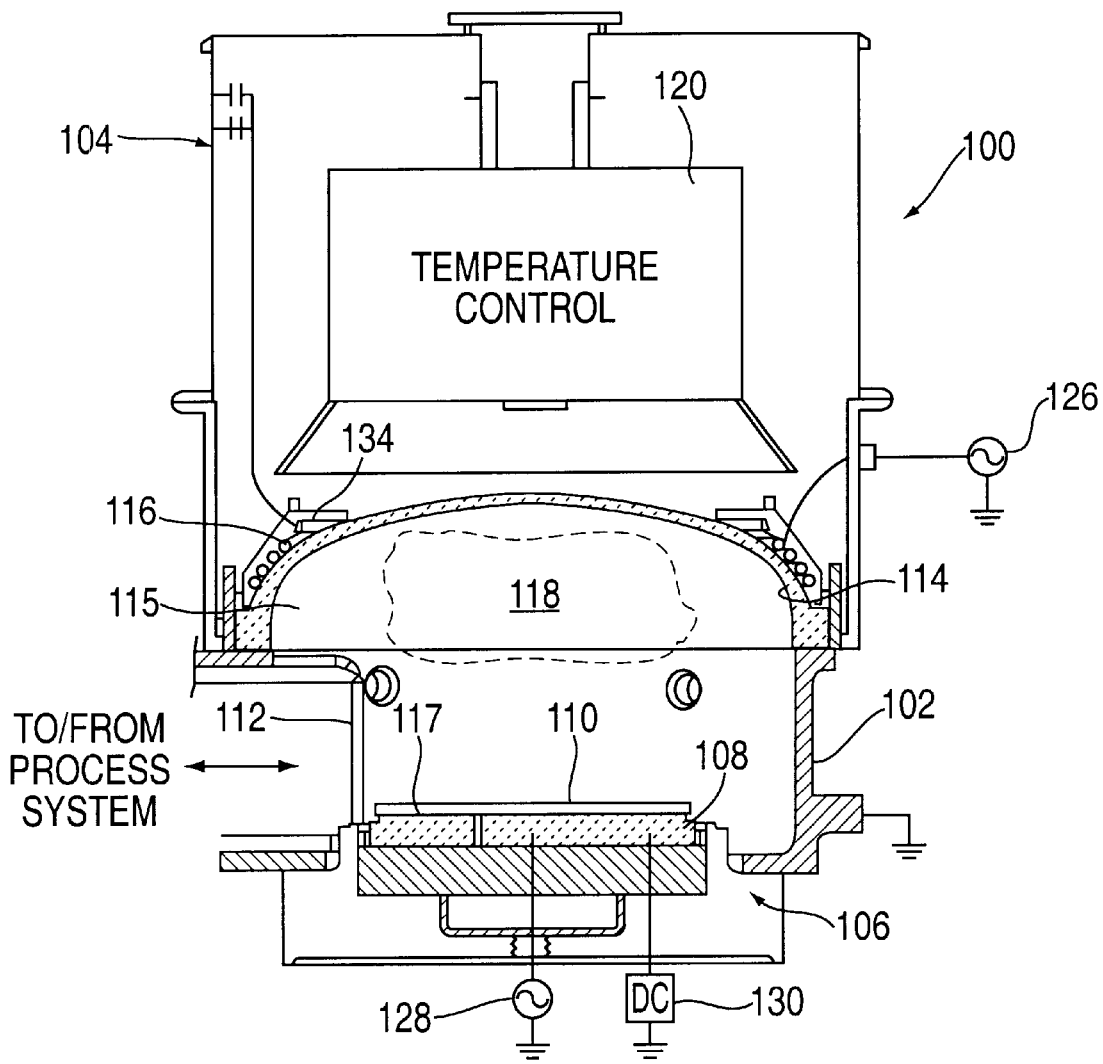
FIG. 1 depicts a schematic view of a semiconductor wafer process chamber containing an electrostatic chuck of the present invention.

The subject invention solves the problems seen and associated with the prior art by providing an electrostatic chuck structure that has improved heat transfer gas distribution features. FIG. 1 depicts a partial sectional, schematic view of a semiconductor wafer process chamber 100 that contains the subject invention for improving distribution of a heat transfer gas in a high temperature (i.e., >400° C.) electrostatic chuck. The process chamber 100 comprises a chamber body 102, a top 114 disposed above the chamber body 102, and an upper enclosure 104 disposed above the top 114. For example, such a process chamber is the DPS etch chamber, which is manufactured and sold by Applied Materials, Inc. of Santa Clara, Calif.

Within the chamber body 102, a pedestal 106 is disposed. Disposed upon the pedestal 106 is an electrostatic chuck 108, for supporting and retaining a semiconductor substrate 110, such as a 200 millimeter (mm) or 300 mm diameter silicon wafer. The pedestal 106 and the electrostatic chuck 108 further comprise various electrical and mechanical connections for retaining the wafer 110 upon chuck 108 and for maintaining temperature control of the wafer 110. Such connections are for example an RF power source 128 connected to the electrostatic chuck 108 for RF biasing of the wafer during processing and a DC power supply 130 for electrostatic chucking of the substrate 110 upon the electrostatic chuck 108. For example, power source 128 is preferably an RF power source operating at a frequency of approximately 13.56 MHz and a power of 100–600 W and DC power source 130 provides a sufficient potential difference to chucking electrodes (explained in greater detail below) to retain the wafer 110 upon the electrostatic chuck 108 (e.g., 200–400 VDC). The semiconductor wafer 110 is transported between the chamber 100 and the process system to which it is attached via a transport mechanism (not shown) extending into the process chamber 100 via slit valve 112. Slit valve 112 allows for communication between the chamber 100 and the process system during non-process conditions as well as maintaining an appropriate vacuum condition in the chamber during wafer processing.

The top or dome 114 forms a vacuum tight seal with the chamber body 102, thus defining a process region 115. The dome 114 is fabricated from a dielectric material and in a preferred embodiment of the invention is quartz having a thickness of approximately one (1) cm. Additionally, the dome 114 is circumscribed by an inductively coupled coil 116, e.g., an antenna. The coils are driven with RF power (i.e., via AC power source 126 operating at approximately 400 KHz and approximately 100–600 W) to generate a plasma field 118 with the chamber 100. The plasma 118 is controlled to effectively process (i.e., etch) the wafer 110 in accordance with specific operational parameters of the process system. A temperature control apparatus 120 is provided in the upper enclosure 104 to regulate the temperature of the dome 114.

Figure 2:
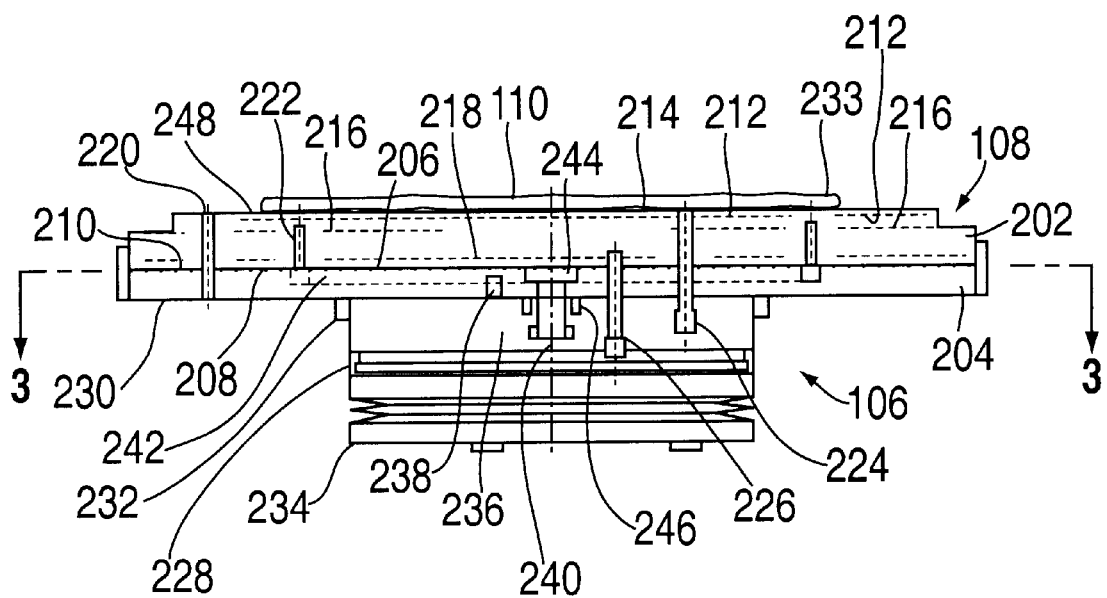
FIG. 2 depicts a partial cross-section view of the electrostatic chuck and attendant chamber components.

FIG. 2 shows a more detailed view of the pedestal 106 and novel electrostatic chuck 108 disposed thereupon. Specifically, the electrostatic chuck is a two-piece composite of a puck 202 and a disk 204. A lower face 206 of the puck 202 and an upper face 208 of the disk 204 form an interface 210 at which the two pieces are joined. In an exemplary embodiment of the invention, the puck 202 and disk 204 are bodies of sintered aluminum nitride that are diffusion bonded (denoted by "x—x") at the interface 210. The puck 202 contains the necessary components for specific wafer processing tasks. Specifically, one or more primary electrodes 212 are proximate a support surface 214 of the puck 202, one or more secondary electrodes 216 are disposed below the primary electrodes 212 and a heater electrode 218 is disposed below the secondary electrodes 216. The puck 202 is provided with a plurality of lift pin holes 220 (only one shown in FIG. 2) to accommodate a corresponding plurality of lift pins (not shown) for raising and lowering the semiconductor wafer 110. Furthermore, the puck 202 comprises a plurality of heat transfer gas ports 222. The ports 222 typically have a diameter that is 20 mils (approximately 0.5 mm) or less, preferably between 0.1 mm and 0.5 mm. One or more electrical connectors are electrically connected to the electrodes 212, 216, 218 to provide the appropriate power to the electrodes for the purposes of for example DC chucking, RF or DC biasing and heating. Specifically, a first electrical connector 224 is electrically connected to the primary 212 and secondary 216 electrodes to supply a combination of RF and DC power to the electrodes for biasing and chucking respectively. A second electrical connector 226 is electrically connected to heater electrode 218 to supply power for heating the wafer clamped to the support surface 214. Alternatively the present invention may be implemented using any number of chuck electrodes 212 and any type of chucking electrode structure including monopolar, bipolar, tripolar, interdigitated, zonal and the like. Furthermore, the chuck 100 may be fabricated without heater electrodes or fabricated as a mechanical chuck without chucking electrodes.

The disk 204 further has a bottom surface 230. A cylindrical-shaped structure 228 is attached to the bottom surface 230 of the disk 204. Specifically, a braze joint ring 232 is brazed to the bottom surface 230 of the disk 204 and the cylindrical-shaped structure 228 to form an air tight seal in an interior region 236 defined by the cylindrical-shaped structure 228 and bottom surface 230. A bellows assembly 234 is also attached to the cylindrical-shaped structure 228 and to the floor of the process chamber (not shown). The bellows assembly 234 facilitates a vertical range of motion for the electrostatic chuck 108 in the process chamber while maintaining the integrity of the air tight seal between a vacuum that exists in the chamber during processing and the interior region 236, which is usually at atmospheric pressure. Additionally, a thermocouple well 238 is formed in the bottom surface 230 of the disk 204 to facilitate securing of a thermocouple (not shown). Such thermocouple is capable of providing signals to a process controller (not shown) for monitoring temperature of the electrostatic chuck 108.

A fitting 240 for a heat transfer gas is also provided on the bottom surface 230 of the disk 204. The fitting is also preferably brazed onto the bottom surface 230 via a second braze joint ring 246. The fitting 240 communicates with a main heat transfer gas bore 244 provided centrally within the disk 204. The main heat transfer gas bore 244 extends from the bottom surface 230 to the top surface 208 and communicates with a plurality of heat transfer gas grooves 242 that are provided in the top surface 208 of the disk 204.

Figure 3:
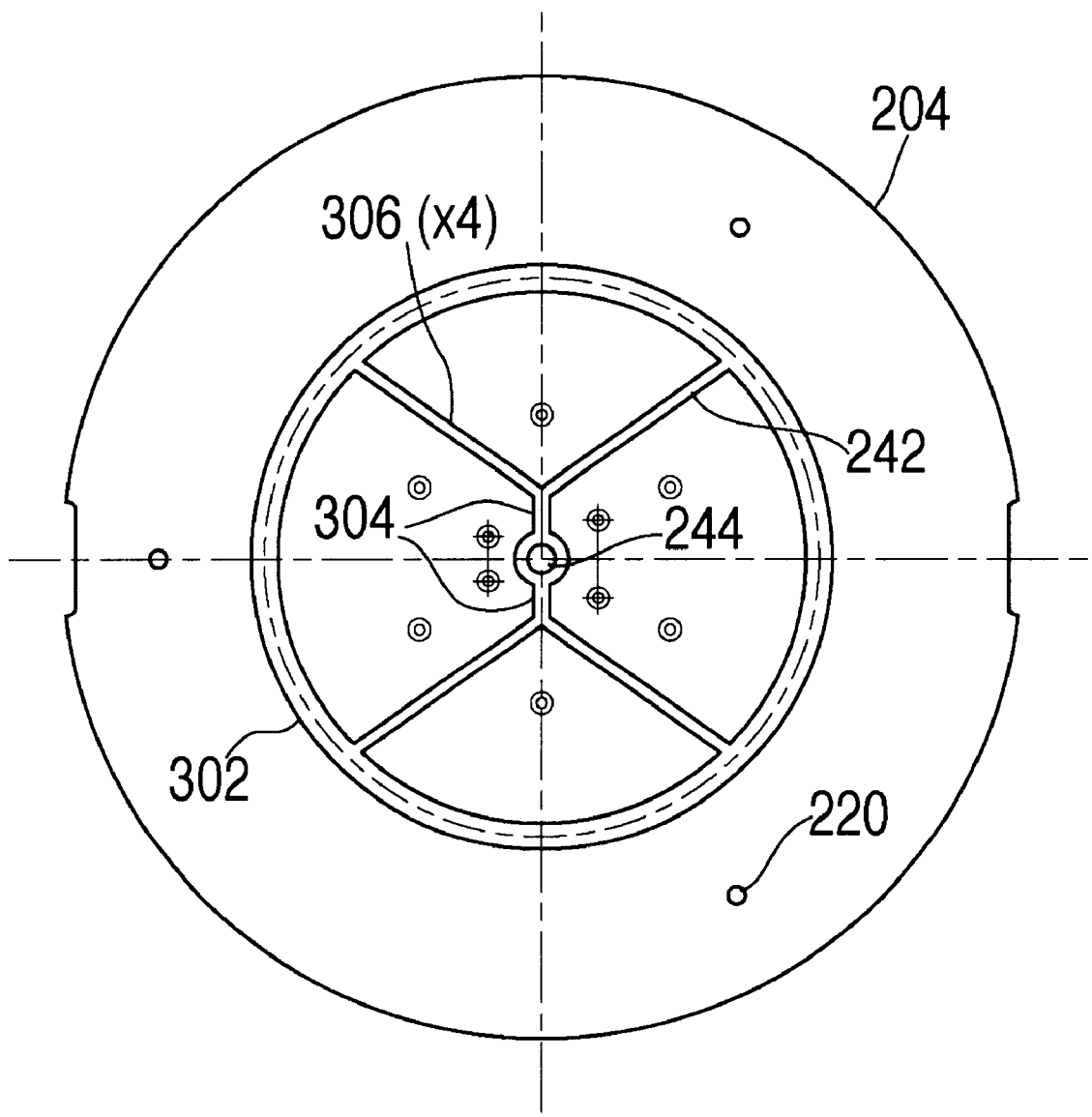
FIG. 3 depicts a top view of a disk of the electrostatic chuck taken along lines 3—3 of FIG. 2

FIG. 3 depicts a top view of the disk 204 as seen along lines 3—3 of FIG. 2. Specifically, the heat transfer gas grooves 242 are shown as a plurality of radially extending grooves from the main heat transfer gas bore 244 to an outer circular groove 302. In greater detail and in a preferred embodiment of the invention, the heat transfer gas grooves 242 further comprise a pair of first radially extending grooves 304 each having a plurality of second radially extending grooves 306 branching off therefrom. Each first radially extending groove 304 extends from the main heat transfer gas bore 244 approximately 180° apart, and then branches off to form the second radially extending grooves 306. The second radially extending grooves 306 extend from the first radially extending groove 304 to the outer circular channel 302. In the illustrative embodiment, each first radially extending groove 304 branches off to two second radially extending grooves 306. For example, each first radially extending groove 304 branches off to form a pair of second radially extending grooves 306, wherein the pair of second radially extending groove 306 is spaced approximately 90° apart.

The grooves 302, 304 and 306 are formed by sculpting the top surface 208 of the disk 204 to produce a pattern of grooves. The bottom surface 206 of the puck 202 covers the grooves 302, 304 and 306 to form channels for transferring the heat transfer gas. Disposed through the puck 202 over the grooves 302, 304 and 306 are the plurality of heat transfer gas ports 222. The heat transfer gas enters the grooves 302, 304 and 306 through the main heat transfer gas port 244 in the disk 204. A remote heat transfer gas source (not shown) is connected to the main heat transfer gas port 244 to supply the heat transfer gas to the chuck 108. In particular, heat transfer is most efficient, and the temperature across the wafer 110 is most uniform, if the heat transfer gas is uniformly distributed over the support surface 214 of the puck 202. To facilitate heat transfer, gas enters the first channels 304 through the main heat transfer gas port 244, travels along the first radially extending grooves 304, through the second radially extending grooves 306, and to the outer circular groove 302. Concurrently, as the heat transfer gas travels through the grooves 302, 304, and 306, the gas exits each of the plurality of heat transfer gas ports 222 in the puck 202 to the underside of the wafer 110.

The heat transfer gas ports 222 in the puck 202 are arranged in a pattern over the grooves 302, 304, and 306, which facilitates distribution of heat transfer gas to where it is needed in order to uniformly cool the wafer 110. For example, if a center of the wafer 110 bows upward under pressure from the cooling gas, periphery 233 of the wafer 110 will be more strongly adhered to the support surface 214 of the puck 202. This is because the force of coulombic attraction between the wafer 110 and the chuck electrodes 212 decreases as the separation between the wafer 110 and electrodes 212 increases. As such, the heat transfer gas from the main heat transfer gas port 244 may not fill all the interstitial spaces between the periphery of the wafer 110 and the support surface 214 of the puck 202. To uniformly fill these interstitial spaces, the heat transfer gas ports 222 are uniformly distributed over the first radially extending grooves 304, the second radially extending grooves 306, and the outer circular groove (i.e., periphery) 302 of the puck 202.

The purpose of the ports 222 is to fill a space 117 between the support surface 214 and the wafer 110 as quickly as possible, e.g. within 1 or 2 seconds. The combined cross sectional area of the ports 222 should be in the range of 0.02 to 0.1 sq. cm. The number of ports 222 depends on the wafer and electrostatic chuck gap conductivity, and the requirement of the heat transfer gas pressure uniformity. For example, 0.05 sq. cm. equals approximately 24 ports, each of 0.5 mm diameter. Since the cross sectional area is proportional to the square of the diameter of the hole, 25 times as many 0.1 mm diameter holes as 0.5 mm diameter ports are required to provide the same cross sectional area. Once the space 117 is filled with a heat transfer gas, further flow of the gas is required only to replace that which leaks out through a less than perfect seal between the wafer 110 and the support surface 214. Hence it is desirable to place the ports 222 as close to the edge the chuck 108 as possible, while remaining radially inward of a sealing point 248. The sealing point 248 is generally in the shape of a band 1 mm to 3 mm in width. The ports 222 are uniformly distributed along a circumference that lies between approximately 1 mm and 5 mm radially inward of the inner edge of the seal band.

Although six grooves 304 and 242 are depicted in FIG. 3, any number of grooves 304 and 242 may be formed in the disk 204. Similarly, although a single outer circular groove 302 is depicted in FIG. 3, any number of concentric grooves may be formed in the disk 204. The grooves 242 should be shallow in depth in order to provide a narrow gap that inhibits plasma ignition therein. The grooves are between approximately 5 to 100 microns in depth and 25 microns or more in width. At depths smaller than 5 microns, the conductance of the heat transfer gas in the channels is too low. Preferably, the grooves 242 are approximately 50 microns deep. At such a depth, the combination of the field strength, heat transfer gas pressure (i.e., wafer backside gas pressure), and gap size prevents the plasma from igniting.

Figure 4:
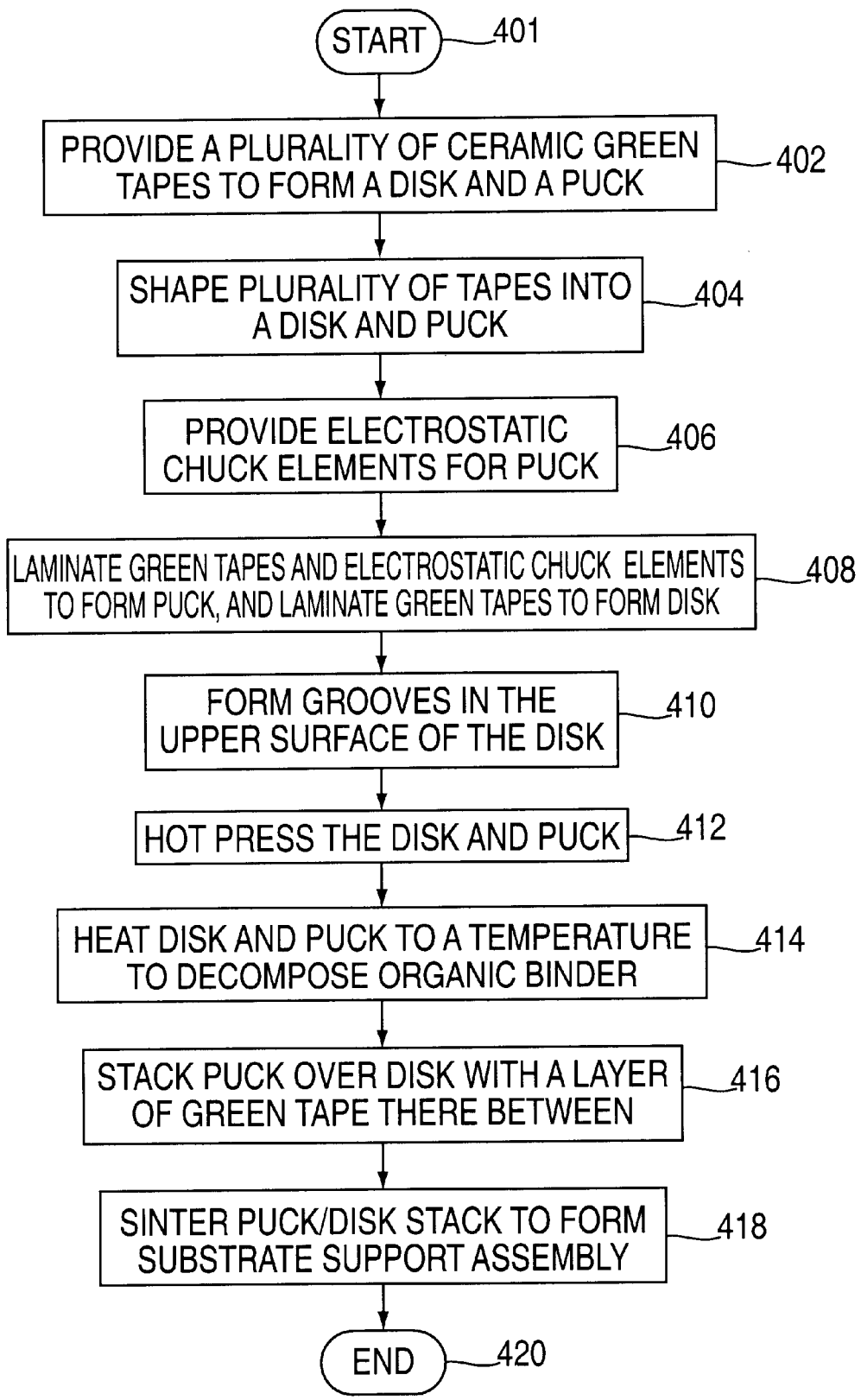
FIG. 4 depicts a flow diagram of the method 400 of the present invention.
Figure 5A:
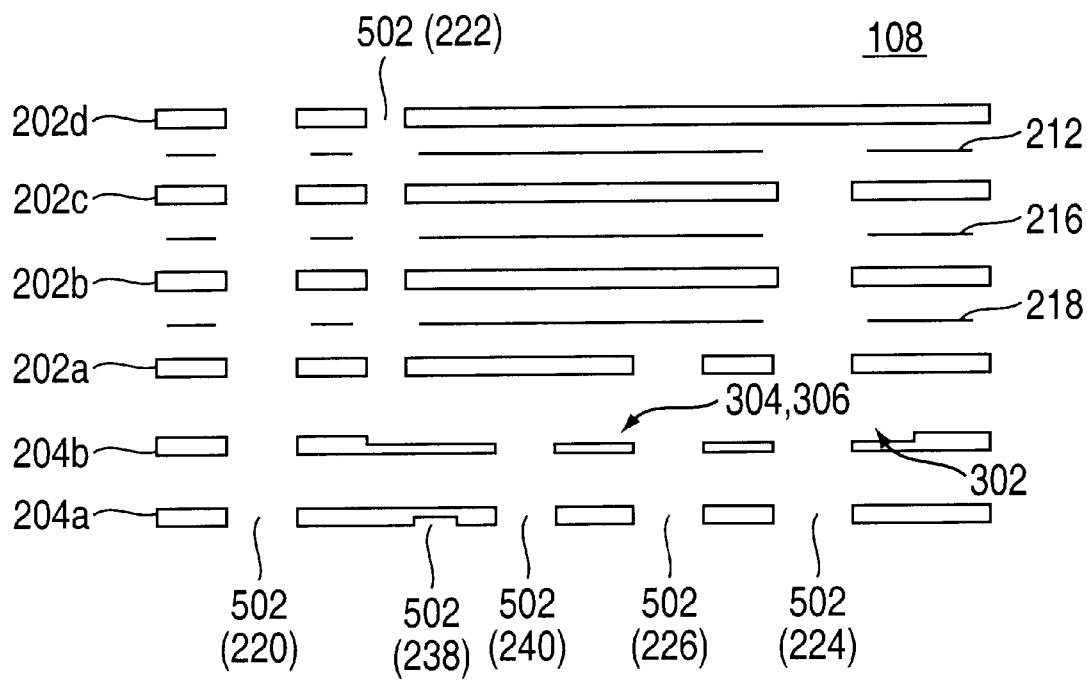
FIGS. 5A through 5D depict the chuck at various stages of fabrication during the method.

The chuck 108 of the present invention may be manufactured according to an inventive method 400. FIG. 4 depicts a flow diagram of the method 400 of the present invention. FIGS. 5A 5B, 5C, and 5D depict the chuck 108 at various stages of fabrication during the method 400. The method 400 begins at step 401. In step 402 a plurality of unfired ceramic green tapes 202a, 202b, 202c, 202d, 204a, and 204b are provided. The green tapes are made from a powdered ceramic such as aluminum nitride or aluminum oxide mixed with an organic binder such as artificial rubber (butadiene) or poly-methyl methacrylate (PMMA) and cast into sheets and sized by means known in the art. In step 404 the green tapes are sized and shaped into disk layers 204a and 204b (collectively disk 204), as well as puck layers 202a–d (collectively puck 202) as depicted in FIG. 5A. Specifically, holes 502 are punched into selected green tapes 202a–d for electrical connectors 224 and 226, main heat transfer gas port 240, gas ports 222, thermocouple well 238, etc. Holes having diameters of 0.2 to 0.5 mm (such as ports 222) can be punched in the green tape layers 202a–d using a special punch and dies as is routinely done in the multilayer ceramic art.

In step 406, the electrostatic chuck elements are provided for in the puck 202. The holes 224, 226, 240, 222 and the like are filled with a metallic material such as a tungsten or molybdenum powder or paste 506. Electrodes 212, 216, 218 are then provided on selected green tapes. For example, the electrodes are screen printed using the tungsten/molybdenum paste 506. Specifically, one or more chuck electrodes 212 and/or 216 are screen printed on green tape 202c and/or 202b of layer 202, and heater electrode 218 is screen printed on green tape 202a of layer 202.

Figure 5B:
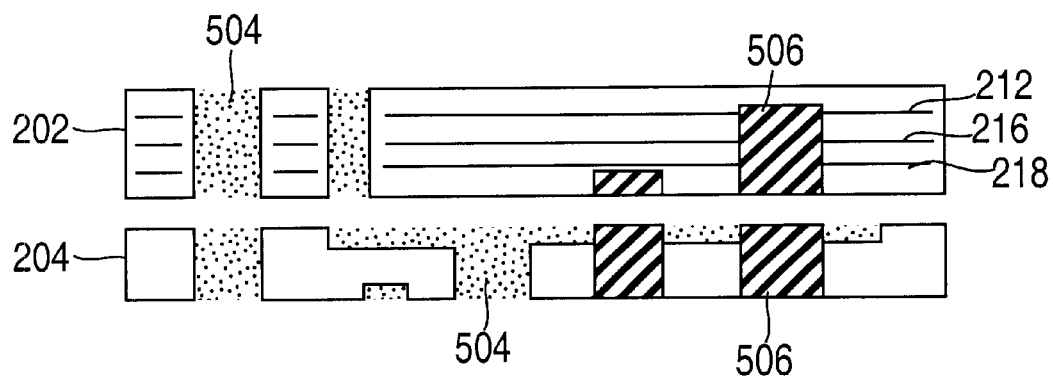
Figure 5C:
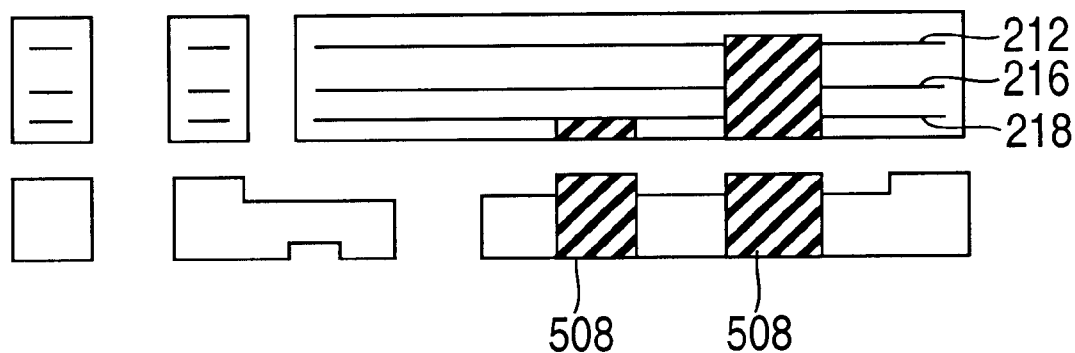

In step 408, the green tapes of the puck 202 are laminated together first to obtain the desired thickness of the puck 202 or to embed the electrodes. For example, the green tapes 202a through 202d are laminated together to form the single composite layer 202 (the puck) as shown in FIG. 5b. Likewise, the green tapes 204a and 204b are laminated together to form the single composite layer 204 (i.e., the disk) as also shown in FIG. 5b.

In step 410, the grooves 304 and 306 and outer circular groove 302 (see FIG. 3) are provided for in the disk 204. Specifically, the grooves are formed to a desired configuration, as well as depth and width on the upper surface of the green tape layer 204b.

In step 412, layers 202a–202d and 204a–b are independently hot pressed by pressing in a press to produce two green laminates (i.e., the puck 202 and disk 204) as shown in FIG. 5B. The puck 202 and disk 204 are independently hot pressed under moderate temperatures and pressures (about 100° C. and between about 100 to 1000 pounds per square inch). Under these conditions, each of the semi-plastic green tapes representing the puck 202 and disk 204 deform and fuse to provide two distinct thick monolithic green body layers. Furthermore, the same deformation also tends to close up the holes 502. To prevent this, the punched holes 502 in the individual green tape layers are filled with a paste 504 of a colored polymer powder such as polymethyl methacrylate (PMMA) using a screen printing method prior to lamination. Similarly the disk 204 (i.e. grooves 304 and 306, and outer circular groove 302) are provided with filler paste 504 to prevent these structures from collapsing during lamination.

The green laminate is then heated in a furnace to remove the organic binder in step 414. This step is performed at a temperature between 300° and 1000°. The filler paste 504 filling the holes 502, puck 202, and grooves 302, 304, and 306 carbonizes, becomes carbon monoxide, and is then removed. The removal of the filler paste 504 from the ports 222 and grooves 302, 304, and 306 leaves behind clean holes and channels in the structure as shown in FIG. 5O. Next, in step 416, the puck 202 is disposed over the disk 204. Specifically, a layer of unfired thin green tape is disposed therebetween the puck 202 and disk 204. More specifically, the holes in the individual green tapes for the puck 202 and disk 204 are lined up in a special aligning fixture before laminating the two ceramics together.

Figure 5D:
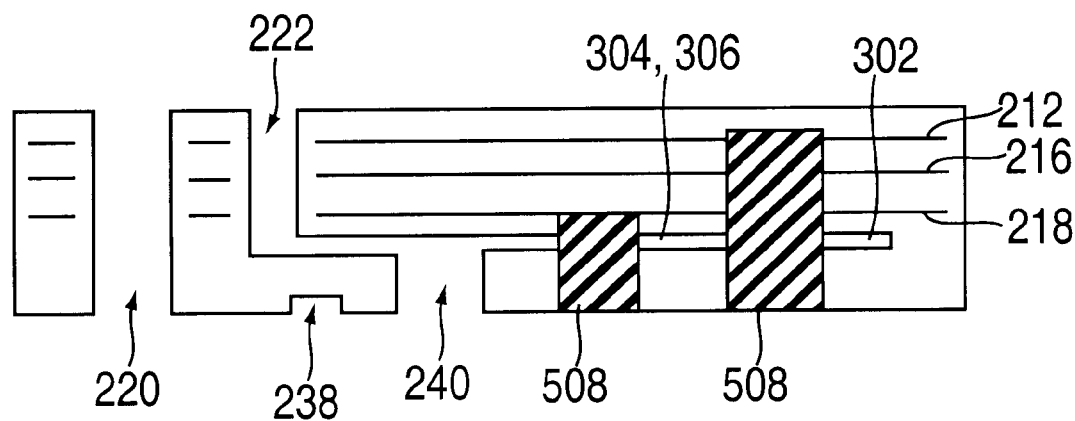

In step 418, the stacked puck/disk 202/204 and green tape therebetween is sintered with controlled oxygen partial pressure at temperatures between 1500° C. to 2100° C. to consolidate the ceramic into a substrate support assembly. Specifically, the joining can be accomplished by reheating the stacked puck/disk 202/204 at the original sintering temperature, and at a very low or no applied pressure, to cause diffusion bonding at the mating surfaces of the puck 202 and disk 204. Concurrently, the metal powder 506 consolidates to form a completed feed through 508 as depicted in FIG. 5D. The oxygen partial pressure of the furnace ambient is controlled through mixing of hydrogen or nitrogen with water vapor. The small amounts of oxygen are intended to remove the carbon residues from the binder during step 414, as well as to keep the Aluminum Nitride, Alumina or other ceramic from being reduced by the reducing ambient in step 416. After sintering is completed, the method 400 ends at step 420.

The resulting chuck 108 exhibits superior distribution of heat transfer gas to backside of the wafer 110. Uniform distribution of heat transfer gas leads to more uniform cooling of the wafer 110 and, hence, more uniform wafer processing. In addition, the small diameter of the ports 222 inhibits the ignition of plasma in the plenum and consequent contamination of the wafer. As a result, fewer wafers are defective, productivity is higher, cost per wafer is lower and profitability is increased. Furthermore, the disk 204 for gas distribution obviates the need to drill holes through the bulk of the chuck body 202. As such, the chuck 108 is more easily fabricated in less time and with lower cost than prior art chucks.

Although various embodiments which incorporate the teachings of the present invention have been shown and described in detail herein, those skilled in the art can readily devise many other varied embodiments that still incorporate these teachings.

What is claimed is:

1. A method of fabricating a semiconductor wafer support chuck apparatus said apparatus having a first sintered layer and a second sintered layer, said method comprising the steps of:
   providing said first sintered layer having a plurality of gas distribution ports;
   providing said second sintered layer having a plurality of grooves;
   stacking said first sintered layer on top of said second sintered layer;
   disposing a diffusion bonding layer between said first sintered layer and said second sintered layer; and
   resintering said stacked first and second sintered layers.

2. The method of claim 1 wherein said first and second sintered layers are made from a ceramic material.

3. The method of claim 1 wherein said diffusion bonding layer comprises a ceramic material.

4. The method of claim 3 wherein said diffusion bonding layer is an unfired green tape.

5. The method of claim 1 wherein prior to providing said first and second sintered layers, said first and second sintered layers are individually formed.

6. The method of claim 5 wherein said forming step comprises the step of providing a plurality of electrostatic chuck elements in said first sintered layer prior to sintering said first sintered layer.

7. The method of claim 6 wherein said forming step further comprises the step of forming a plurality of holes in said first sintered layer prior to sintering said first sintered layer.

8. The method of claim 7 wherein a first portion of said plurality of holes are said plurality of gas distribution ports.

9. The method of claim 8 wherein a second portion of said plurality of holes are a plurality of chucking element feedthroughs.

10. The method of claim 8 wherein said forming step further comprises the step of providing said plurality of grooves in said second sintered layer prior to sintering said second sintered layer.

11. The method of claim 10 wherein said forming step further comprises filling said first portion of said plurality of holes and said plurality of grooves with a filler paste therein prior to sintering said first and second sintered layers.

12. The method of claim 11 wherein said filler paste is an organic binder.

13. The method of claim 12 wherein said organic binder is polymethyl methacrylate (PMMA).

14. The method of claim 9 wherein said forming step further comprises the step of providing a metallic material in said second portion of said plurality of holes.

15. The method of claim 14 wherein said metallic material is selected from the group comprising molybdenum and tungsten.

* * * * *

UNITED STATES PATENT AND TRADEMARK OFFICE
CERTIFICATE OF CORRECTION

PATENT NO.     : 6,572,814 B1
DATED          : June 3, 2003
INVENTOR(S)    : Shamouil Shamoulian et al.

It is certified that error appears in the above-identified patent and that said Letters Patent is hereby corrected as shown below:

Column 7,
Line 58, please change "1000°" to -- 1000°C --.
Line 63, please change "Fig. 50" to -- Fig. 5C --.

Signed and Sealed this

Twelfth Day of August, 2003

JAMES E. ROGAN
*Director of the United States Patent and Trademark Office*